UNITED STATES PATENT OFFICE.

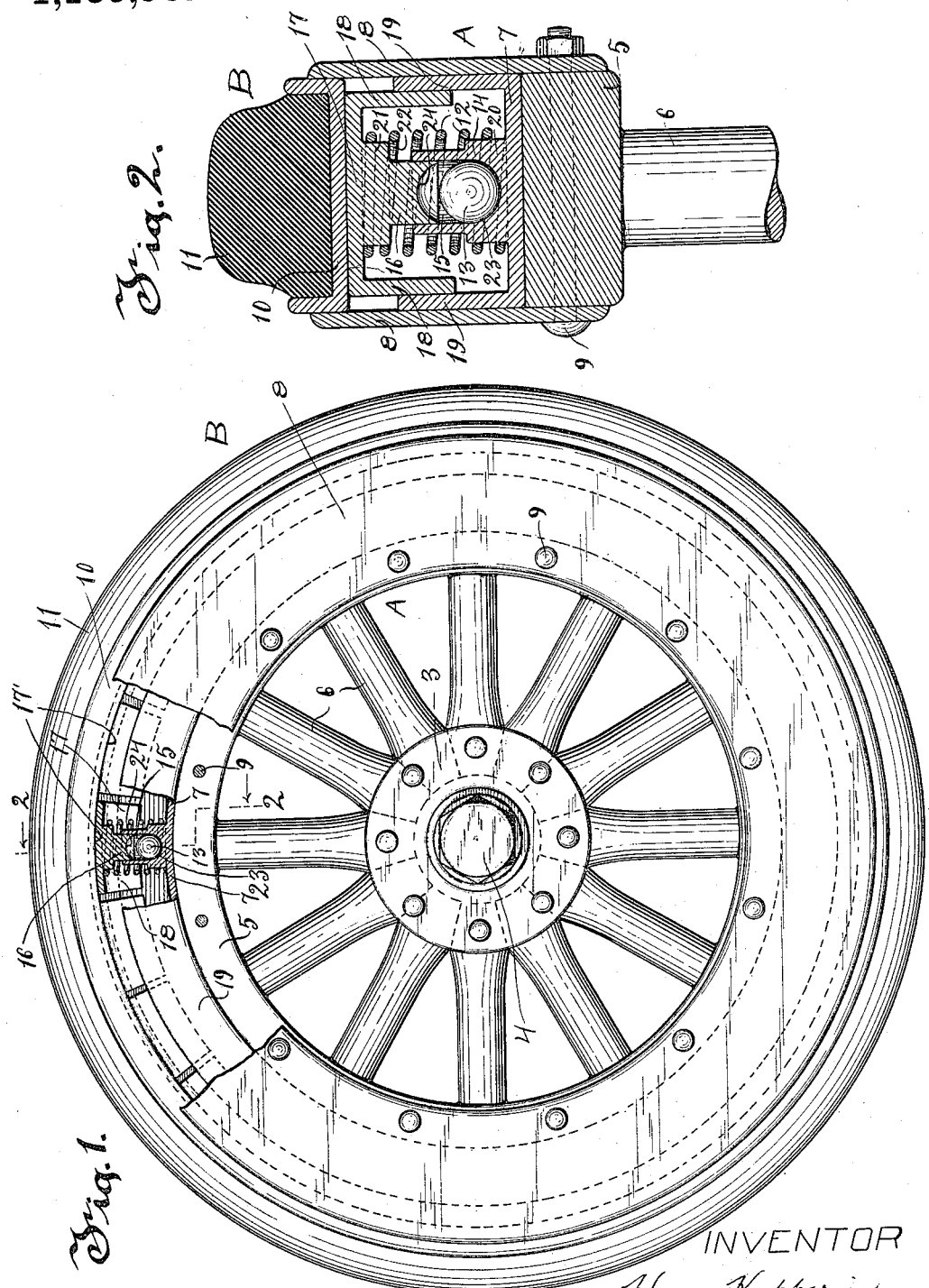

HENRY KUPPERIAN, OF MILWAUKEE, WISCONSIN.

RESILIENT WHEEL.

1,159,961.

Specification of Letters Patent.

Patented Nov. 9, 1915.

Application filed August 6, 1915. Serial No. 43,921.

*To all whom it may concern:*

Be it known that I, HENRY KUPPERIAN, a citizen of the United States, and resident of Milwaukee, in the county of Milwaukee and State of Wisconsin, have invented new and useful Improvements in Resilient Wheels, of which the following is a description, reference being had to the accompanying drawings, which are a part of this specification.

The invention relates to resilient wheels and more particularly to that type of resilient wheel consisting of inner and outer concentrically mounted movable wheel members and cushioning means between said members.

The invention is designed more particularly to provide a resilient wheel of the type mentioned in which the cushioning means between the movable wheel members consists of a plurality of springs for absorbing the lighter shocks to the vehicle and a plurality of solid rubber balls for absorbing the heavier shocks.

The invention is further designed to provide a new and improved form of resilient wheel.

The invention consists in the several features hereinafter set forth and more particularly defined by claims at the conclusion hereof.

In the drawings, Figure 1 is an elevational view of the device embodying the invention, parts being broken away and parts being shown in section; Fig. 2 is a section taken on line 2—2 of Fig. 1.

The device consists of inner and outer concentrically mounted movable wheel members A and B and cushioning between said members. The inner movable wheel member A comprises a hub 3 in which the axle 4 is mounted, a felly 5 secured to the hub by spokes 6, a rim 7 and side guide plates 8 secured to said felly by bolts 9. The outer movable wheel member B comprises a flanged rim 10 provided with a tire 11 which is shown as a solid rubber tire though it is obvious that the rim may be altered to accommodate a pneumatic tire if desired.

The cushioning means between the members A and B comprises a plurality of coiled springs 12, and a plurality of solid rubber balls 13 and means for operatively positioning and securing said springs and balls to said members. The means for positioning and securing the springs 12 between the movable wheel members comprises a plurality of outwardly radially extending cylindrical lugs 14 preferably integral with the rim 7 and provided with cylindrical bores 15 adapted to receive inwardly extending cylindrical lugs 16 carried by plates 17, each of said plates 17 being provided with side flanges 18 which are slidably mounted with respect to the side flanges 19 of the rim 7 and with slightly curved upper surfaces 17' contacting with the inner side of the rim 10. The cylindrical portions 20 of the lugs 14 adjacent the rim 7 and the cylindrical portions 21 of the lugs 16 adjacent the plates 17 are of a diameter substantially equal to the inner diameter of the springs 12 and the springs are mounted on said cylindrical portions. The flanges 18 and 19 and the bores 15 and lugs 16 coöperate to properly guide the plates 17 with respect to the inner wheel member when said plates are moved by either of said wheel members. The lugs 16 are provided with shouldered portions 22 which abut against the tops of the lugs 14 when the plates 17 are moved inwardly against the action of the springs 12 and these portions serve as stops to limit the inward movement of said plates. The inner ends of the bores 15 are shaped to form spherically concave pockets 23 which are adapted to receive the balls 13 and the outer ends of the lugs 16 are shaped to form spherically concave ball engaging portions 24. The ends of the lugs 16 on the plates 17 being cylindrical and slidably mounted in the bores 15 they are guided by said bores so that their concave ends come into contact with the balls 12 in the pockets 23. The plates 8 extending outwardly from the member A form guides for the rim 10 of the member B. It will be seen that each spring is carried by its respective lug and plate and should it become broken or the ball within the lug have to be replaced this may be readily accomplished by removing one of the side plates 8 and removing the rim 10 from the wheel.

From the foregoing description it will be apparent that any force tending to move the inner wheel member outwardly or the outer wheel member inwardly will be resisted by the springs 12 interposed therebetween and if considerable, the force will be resisted by the rubber balls 13 when the ends of the plates 17 come into contact with them.

The invention thus exemplifies a resilient wheel of the type mentioned in which the cushioning means between the wheel members consists of a plurality of springs and yielding material.

The invention is not to be restricted to the details of construction herein set forth but may be varied so long as it is within the scope of the appended claims.

What I claim as my invention is:—

1. A resilient wheel comprising inner and outer concentrically mounted movable wheel members, said inner member being provided with a flanged rim and having radially outwardly extending lugs, each of said lugs having a bore therein, a plurality of removable plates, each of said plates having an inwardly extending lug slidably mounted in the bore of one of said radially extending lugs, said plates having side flanges slidably engaging the flanges on said rim, springs carried by the lugs on said plates and said rim, said movable wheel member comprising a rim mounted on said plates, and side plates carried by the inner wheel member and slidably engaging the rim of the outer wheel member.

2. A resilient wheel comprising inner and outer concentrically mounted movable wheel members, said inner member being provided with a flanged rim and having radially outwardly extending lugs, said lugs having pockets therein, a plurality of removable plates, each of said plates having an inwardly extending lug mounted in the pocket of one of said radially extending lugs, said plates having side flanges slidably engaging the flanges on said rim, springs carried by the lugs on said plates and said rim, blocks of yielding material disposed in the pockets in said lugs on the rim, said movable wheel member comprising a rim mounted on said plates, and side plates carried by the inner wheel member and slidably engaging the rim of the outer wheel member.

In testimony whereof, I affix my signature, in presence of two witnesses.

HENRY KUPPERIAN.

Witnesses:
A. L. MORSELL,
FLORENCE M. BOUCHARD.

Copies of this patent may be obtained for five cents each, by addressing the "Commissioner of Patents, Washington, D. C."